United States Patent
Henry et al.

(10) Patent No.: US 10,945,231 B1
(45) Date of Patent: Mar. 9, 2021

(54) REGULATION OF AIRTIME FOR FINE TIMING MEASUREMENT REQUESTS

(71) Applicant: Cisco Technology, Inc., San Jose, CA (US)

(72) Inventors: Jerome Henry, Pittsboro, NC (US); Akram I. Sheriff, San Jose, CA (US); Vishal S. Desai, San Jose, CA (US); Santosh Ramrao Patil, Santa Clara, CA (US); Robert E. Barton, Richmond (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/810,707

(22) Filed: Mar. 5, 2020

(51) Int. Cl.
| | |
|---|---|
| *H04W 4/00* | (2018.01) |
| *H04W 64/00* | (2009.01) |
| *H04W 24/10* | (2009.01) |
| *G01S 11/06* | (2006.01) |
| *H04W 4/30* | (2018.01) |
| *H04W 4/02* | (2018.01) |

(52) U.S. Cl.
CPC .......... *H04W 64/003* (2013.01); *G01S 11/06* (2013.01); *H04W 4/023* (2013.01); *H04W 4/30* (2018.02); *H04W 24/10* (2013.01)

(58) Field of Classification Search
USPC ............................ 455/456.1, 456.6; 370/338
See application file for complete search history.

(56) References Cited

U.S. PATENT DOCUMENTS

| | | | |
|---|---|---|---|
| 9,226,260 B2 | 12/2015 | Steiner et al. | |
| 9,769,626 B2 | 9/2017 | Bajko et al. | |
| 10,129,120 B2 | 11/2018 | Aldana et al. | |
| 10,187,817 B2 | 1/2019 | Sanderovich et al. | |
| 10,484,814 B2* | 11/2019 | Wang | H04W 24/10 |
| 10,609,670 B2* | 3/2020 | Lindquist | H04W 64/00 |
| 2014/0235266 A1* | 8/2014 | Edge | G01S 5/02 455/456.1 |
| 2014/0335885 A1* | 11/2014 | Steiner | H04W 64/00 455/456.1 |

(Continued)

FOREIGN PATENT DOCUMENTS

WO 2018081100 A1 5/2018

OTHER PUBLICATIONS

WiSee, "Whole-Home Gesture Recognition Using Wireless," [Accessed Online Feb. 12, 2020] <http://wisee.cs.washington.edu/>.

(Continued)

*Primary Examiner* — David Q Nguyen
(74) *Attorney, Agent, or Firm* — Patterson + Sheridan, LLP

(57) ABSTRACT

Techniques for improved wireless ranging are provided. A first communication from a first device is received at a first access point. A predefined minimum distance is determined for the first access point, where the predefined minimum distance corresponds to a distance at which the vertical location of the first access point causes inaccurate location estimations. A first distance of the first device from the first access point is estimated. Upon determining that the first distance of the first device is below the predefined minimum distance, fine timing measurement (FTM) requests from the first device are declined.

20 Claims, 9 Drawing Sheets

(56) References Cited

U.S. PATENT DOCUMENTS

| | | | |
|---|---|---|---|
| 2015/0139212 A1* | 5/2015 | Wang | G01S 5/06 |
| | | | 370/338 |
| 2015/0163633 A1* | 6/2015 | Mishra | H04W 4/023 |
| | | | 455/456.6 |
| 2015/0181553 A1* | 6/2015 | Segev | G01S 5/14 |
| | | | 455/456.1 |
| 2016/0234703 A1* | 8/2016 | Aldana | G01S 5/12 |
| 2016/0366548 A1* | 12/2016 | Wang | G01S 13/825 |
| 2017/0064505 A1* | 3/2017 | Eyal | H04W 4/023 |
| 2017/0188300 A1* | 6/2017 | Eyal | H04W 52/0209 |
| 2017/0374639 A1* | 12/2017 | Aldana | H04W 64/00 |
| 2018/0309538 A1* | 10/2018 | Verma | H04W 52/0235 |
| 2019/0116627 A1* | 4/2019 | Min | H04W 64/00 |
| 2019/0191323 A1 | 6/2019 | Venkatesan et al. | |

OTHER PUBLICATIONS

Google Git, "wifi_hal.h-platform/hardware_legacy" [Accessed Online Feb. 12, 2020] <https://android.googlesource.com/platform/hardware/libhardware_legacy/+/master/include/hardware_legacy/wifi_hal.h>.
Google Git, inlcude/harware_legacy/rtt.h [Accessed Online Feb. 12, 2020] <https://android.googlesource.com/platform/hardware/libhardware_legacy/+/master/include/hardware_legacy/rtt.h>.

* cited by examiner

REGULATION OF AIRTIME FOR FINE TIMING MEASUREMENT REQUESTS

TECHNICAL FIELD

Embodiments presented in this disclosure generally relate to regulation of wireless requests. More specifically, embodiments disclosed herein regulation of location-based requests of client devices.

BACKGROUND

Fine Timing Measurement (FTM) in wireless deployments (such as 802.11) allows an initiating station (often a client device) to exchange ranging frames with a responding station (often an access point or AP) to determine the relative position of the initiating station, with respect to the responding station. Further, if the position of the responding station is known, FTM allows for the determination of the geographic location of the initiating station. FTM is typically based on time of flight (ToF), measured as the detection of the preamble of the FTM frames by the receiver. Although this measurement has potential be accurate, it fails to account for many typical deployment environments. Further, there is currently no regulation of what devices can initiate such requests, how often they can do so, and the like.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
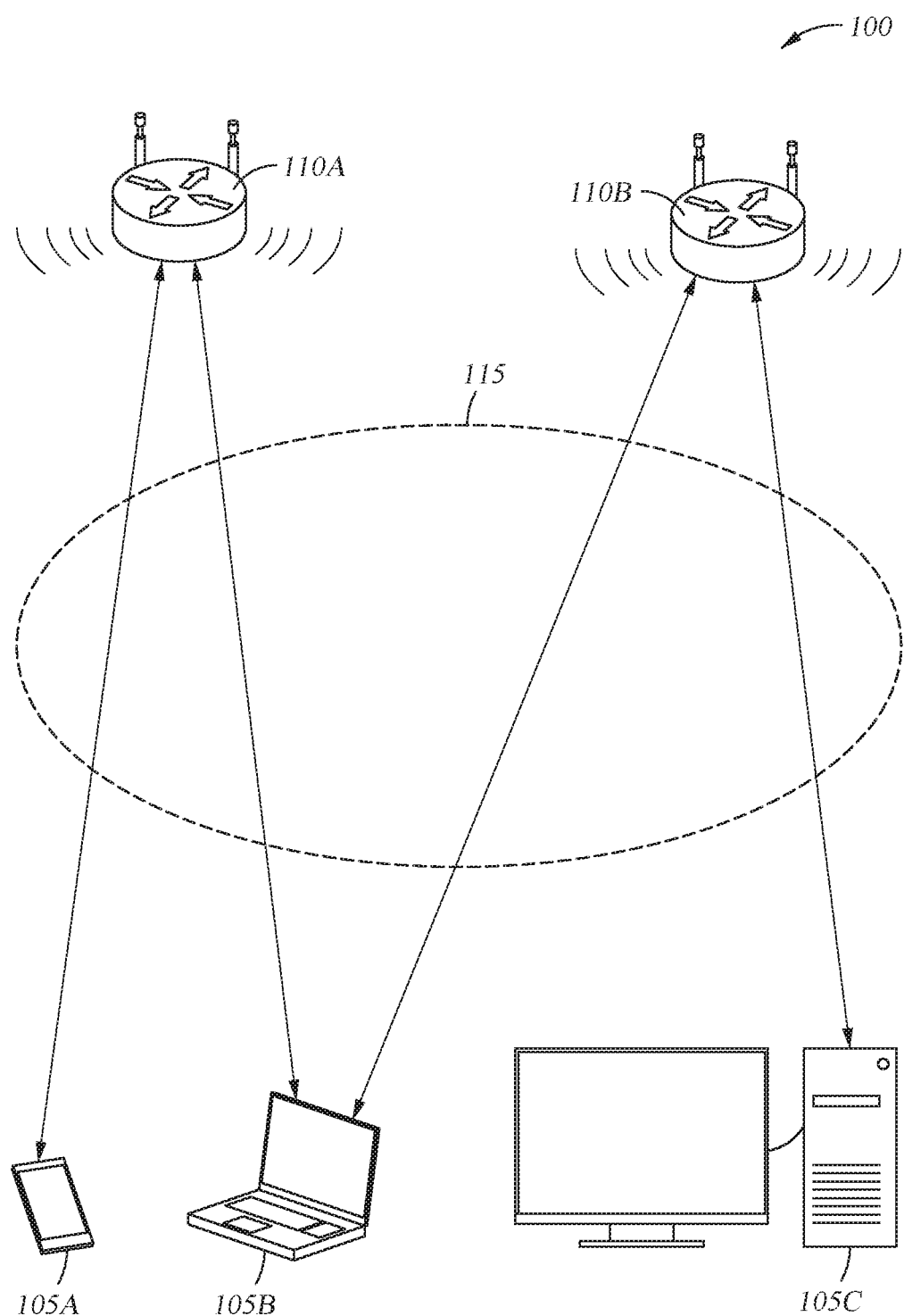
FIG. 1 depicts a system configured to selectively respond to client requests based on a variety of factors, according to one embodiment disclosed herein.

One embodiment presented in this disclosure is a method. The method includes receiving, at a first access point, a first communication from a first device. The method further includes determining a predefined minimum distance for the first access point, wherein the predefined minimum distance corresponds to a distance at which the vertical location of the first access point causes inaccurate location estimations, and estimating a first distance of the first device from the first access point. Additionally, upon determining that the first distance of the first device is below the predefined minimum distance, the method includes declining fine timing measurement (FTM) requests from the first device.

Another embodiment presented in this disclosure is a non-transitory computer-readable storage medium. The computer-readable storage medium contains computer program code that, when executed by operation of one or more computer processors, performs an operation. The operation includes receiving, at a first access point, a first communication from a first device. The operation further includes determining a predefined minimum distance for the first access point, wherein the predefined minimum distance corresponds to a distance at which the vertical location of the first access point causes inaccurate location estimations, and estimating a first distance of the first device from the first access point. Additionally, upon determining that the first distance of the first device is below the predefined minimum distance, the operation includes declining fine timing measurement (FTM) requests from the first device.

Another embodiment presented in this disclosure is a system. The system includes one or more computer processors, and a memory. The memory contains a program which, when executed by the one or more computer processors, performs an operation. The operation includes receiving, at a first access point, a first communication from a first device. The operation further includes determining a predefined minimum distance for the first access point, wherein the predefined minimum distance corresponds to a distance at which the vertical location of the first access point causes inaccurate location estimations, and estimating a first distance of the first device from the first access point. Additionally, upon determining that the first distance of the first device is below the predefined minimum distance, the operation includes declining fine timing measurement (FTM) requests from the first device.

Example Embodiments

Embodiments of the present disclosure provide techniques to regulate airtime by selectively allowing and declining FTM requests (or other requests) based on a variety of factors. Various embodiments of the present disclosure can provide an improved FTM implementation to selectively accept or ignore/reject FTM requests, based on the infrastructure's knowledge of the radio frequency (RF) environment, and/or the measured efficiency of ranging at different points of the cell. Additionally, some embodiments of the present disclosure can be used to avoid wasted airtime and client/AP resources (e.g. battery and computing resources) through FTM exchanges that will not provide usable results. Embodiments disclosed herein can further provide techniques to avoid providing clients with unusable data.

Existing approaches do not include provisions to regulate which AP a client device should or can query, nor do they allow the system to establish a limit on the set of clients to which an AP should answer. One major issue of such unbounded methods is that ranging performances are not monotonic over distance. That is, accuracy declines with distance and worsens with multipath. In such cases, there are distances at which FTM is not desired or useful.

For example, at very short distances (e.g. when the client device is right below an AP mounted inn or on the ceiling), ranging may yield a valid distance, but in the absence of knowledge about the AP height (which is only optionally transmitted or available to/by the AP), the distance computed is meaningless and source of added error for the client. Stated differently, at close range, verticality plays a significant role in the estimates. Because the distance to the AP is the hypotenuse of a triangle in three-dimensional space while the client assumes a two-dimensional deployment (with the AP near the same vertical level as the client), the client can significantly overestimate the distance to the AP. That is, the AP may be much closer than the client measures/estimates, because the FTM data represents the hypotenuse between the client and AP, not the horizontal distance to the AP.

Similarly, at larger distances, accuracy can degrade below the point where ranging is useful. At such larger ranges, multipath interference can render the reading unusable for many client locations. Often, the results can be improved by using closer APs when they are available. Some embodiments of the present disclosure therefore provide techniques to identify and suggest particular APs for ranging.

Moreover, at any range, obstacles can result in overestimated ranging. Some channel state information (CSI) readings can partially compensate for this issue, and received signal strength indicator (RSSI) dampening can also be helpful, but the client does not typically have sufficient samples to efficiently compensate in real time and in an unknown environment. In some embodiments, The AP can detect the non-line of sight (nLoS) signals, and identify angles where the client should not obtain a range because it will not be usable. The line of sight (LoS) signal is additionally too weak to be considered if significant obstacles are present, and only the reflected components can be used. This results in significant error.

Additionally, client devices can often attempt ranging in conditions where ranging is not useful (e.g. because the client device is not moving, but an application continues to perform ranging in the background). Existing solutions do not provide techniques to reduce or eliminate these and other issues.

Embodiments of the present disclosure provide techniques to selectively respond to client requests based on a variety of factors, including connection info (e.g., CSI, RSSI, multipath separation, signal variance, and the like), the distance of the client to the AP, the physical environment, the location of the client, and the like. By selectively responding to such requests, the system can improve the functionality of the network by reducing airtime wasted for non-useful requests. In embodiments, the system can further improve the operations of the client devices by preventing them from making requests that will not be useful, in the future.

FIG. 1 depicts a system 100 configured to selectively respond to client requests based on a variety of factors, according to one embodiment disclosed herein. In the illustrated deployment, a set of APs 110A-B provide connectivity to a set of Client Devices 105A-C. Although two APs 110 are included in the illustrated embodiment, any number of APs 110 can be used any various embodiments. Similarly, although three Client Devices 105 are depicted, in embodiments, any number of Client Devices 105 can be present in the network.

In embodiments, the APs 110 provide connectivity to a network, which can include wired, wireless, or a combination of wired and wireless connections. For example, the APs 110 may provide a WiFi network. This local area network (LAN) and/or wireless LAN (WLAN) may provide connectivity among the Client Devices 105. In some embodiments, the APs 110 can also provide connectivity to one or more broader networks, including the Internet. In various embodiments, each Client Device 105 can be connected to one or more APs 110.

In the illustrated embodiments, the APs 110 also provide ranging services, depicted by the Exchanges 115. In at least one embodiment, the ranging services take the form of FTM exchanges. In some embodiments, each AP 110 can advertise whether it supports FTM (e.g., in multicast and/or unicast transmission). In an FTM exchange, a Client Device 105 can transmit an FTM request to one or more APs 110. This can include transmitting a request to an AP 110 that has advertised availability of FTM, as well as to APs 110 that have not advertised such availability (e.g., to inquire whether FTM is available). The APs 110 can then determine whether to respond to the request, or to ignore it and/or reject it, based on a variety of factors discussed below. In embodiments, the FTM Exchanges 115 involve transmitting any number of frames between the AP(s) 110 and the requesting Client Device 105, in order to estimate the distance between them. In at least one embodiment, this ranging is performed based on the latency between transmission and receipt (e.g., due to the propagation delay of the signal, which depends on the speed of light).

In one embodiment, the APs 110 can be configured to first determine or estimate the distance to the requesting Client Device 105 based on a number of factors. For example, based on factors like the client's RSSI, CSI, channel state, multipath separation, RSSI variance, stochasticity of the signal, and the like, the AP 110 can determine whether to accept or reject the request. In one embodiment, the system rejects FTM requests if the Client Device 105 is too-close to the AP 110 (e.g., below a predefined threshold), because the verticality of the environment will play too-strong of a role. In some embodiments, this threshold can be learned and/or configured by a user. For example, an administrator may specify distance thresholds for each AP 110, based on the environment (e.g., based on the vertical height of the AP 110 above the floor or other area where Client Devices 105 are expected).

Generally, APs 110 that are further above the plane of Client Devices 105 will be assigned relatively higher minimum distance thresholds, as compared to APs 110 that are closer to the floor. In some embodiments, the system can learn these thresholds over time. For example, by observing the accuracy and reliability of ranging requests over time, the system can learn a minimum threshold distance at which ranging should be rejected.

In some embodiments, APs 110 can additionally reject requests from Client Devices 105 which exceed a maximum distance threshold. That is, because the client is far from the AP 110 and ranging is likely to be inaccurate (e.g., due to low signal strength, intervening obstacles, multipath issues, and the like), the system can reject these requests. As above, in various embodiments, the maximum threshold can similarly be manually configured, and/or learned over time based on observing the RF environment.

In at least one embodiment, the APs 110 can further consider the prior history of the Client Device 105 in order to determine whether to accept or decline the request. For example, the AP 110 can analyze the RSSI, CSI, channel state, prior ranging requests, and the like in order to determine whether the Client Device 105 is moving (or has moved since the last request). If not, in one embodiment, the AP 110 can reject the request, because it will be useless (e.g., it will not yield new information). This can reduce overhead and resource consumption in the system.

In some embodiments, the APs 110 evaluate the stochasticity of the signal from the Client Device 105 in order to determine whether to accept ranging. For example, if an RF obstacle is present between the Client Device 105 and the AP 110, the signal may exhibit stochasticity above one or more thresholds. This can indicate that ranging would be inefficient or inaccurate. In embodiments, this evaluation may include determining whether the signal variance exceeds a threshold from the mean value, whether the distribution of the signal fits a normal curve, and the like.

In some embodiments, the AP 110 may additionally evaluate the location of the Client Device 105 in determining whether to respond to ranging. For example, in one embodiment, after performing FTM ranging, a Client Device 105 may inform the AP(s) 110 of their location using a location measurement report (LMR). In such an embodiment, the APs 110 can use this information to refine their thresholds and processes. Further, in some embodiments, the APs 110 can utilize this information when responding to ranging requests. For example, in one such embodiment, the AP system can identify RF dark zones based on the LMR reports received from one or more Client Devices 105, in order to identify areas where ranging leads to inaccurate location estimates. The system can then use this data to determine whether to accept FTM requests originating from a Client Device 105 positioned in one such dark zone.

For example, in one embodiment, the AP 110 can estimate the range to the Client Device 105 and/o to accept or reject requests using Pythagorean computation (such as a Bayesian approach) to account for the angle between the AP 110 and the Client Device 105. That is, because the AP 110 position and height is typically known, the minimum distance at which FTM requests are accepted can depend on angular values (as the estimated distance is the hypotenuse of the triangle). The system can therefore be configured to only accept ranging when the distance between the floor and the Client Device 105, as well as the distance between the Client Device 105 and AP 110, are within a maximum ratio to minimize the distance error. In at least one embodiment, this maximum ratio is derived using Pythagorean Theorem.

In another embodiment, the system can utilize predefined forbidden zones (also referred to as "dark zones") in responding to clients. In such an embodiment, each AP 110 may understand that some locations in the space will yield inaccurate ranging, and decline to respond to requests from Client Devices 105 located in those zones. That is, an AP 110 can understand that if the Client Device 105 is located in such a zone (e.g., behind a large obstacle), the request should be denied. In embodiments, these dark zones may be specified by an administrator, and/or learned over time (e.g., by observing patterns of requests and locations of clients).

In at least one embodiment, if the location of the Client Device 105 is known, the AP 110 can identify other APs 110 that are better-suited to provide ranging, and suggest these APs 110 to the Client Device 105. For example, an AP 110 may realize that it is too far from the client to provide accurate results, and identify one or more other APs 110 that are closer to the Client Device 105.

Embodiments of the present disclosure can therefore increase the efficiency of FTM exchanges by enabling the infrastructure to only accept FTM exchanges from Client Devices 105 in contexts where the exchange is likely to produce a usable result for the station. In contexts where RF conditions and/or the client position has been determined to be incompatible with useful FTM results, the infrastructure can refuse to honor the FTM request, thus avoiding wasted airtime for a result that would not help the Client Device 105.

Figure 2A:
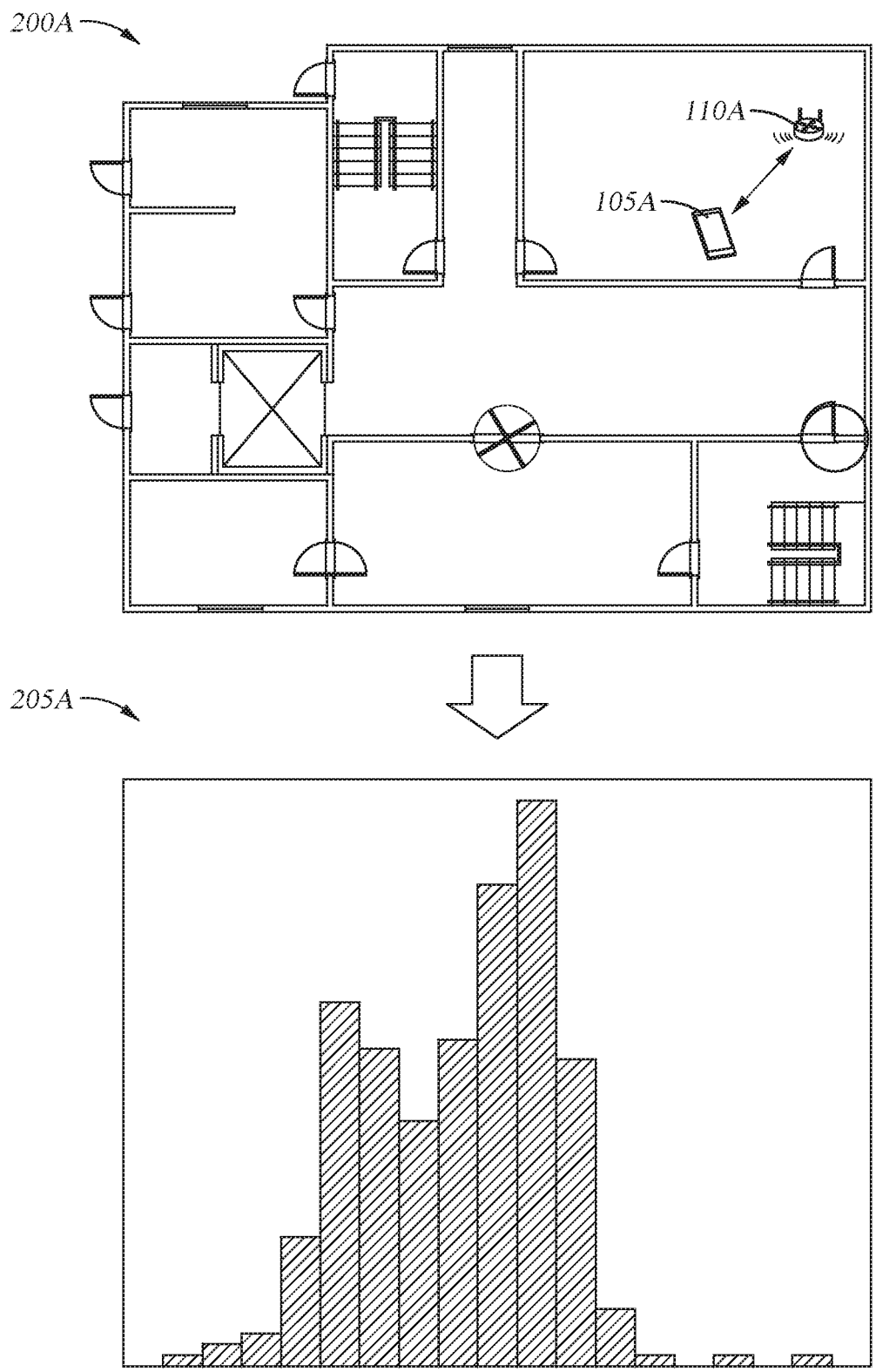
FIGS. 2A, 2B, and 2C depict deployment environments and RF characteristics used to selectively respond to client requests, according to several embodiments disclosed herein.
Figure 2B:
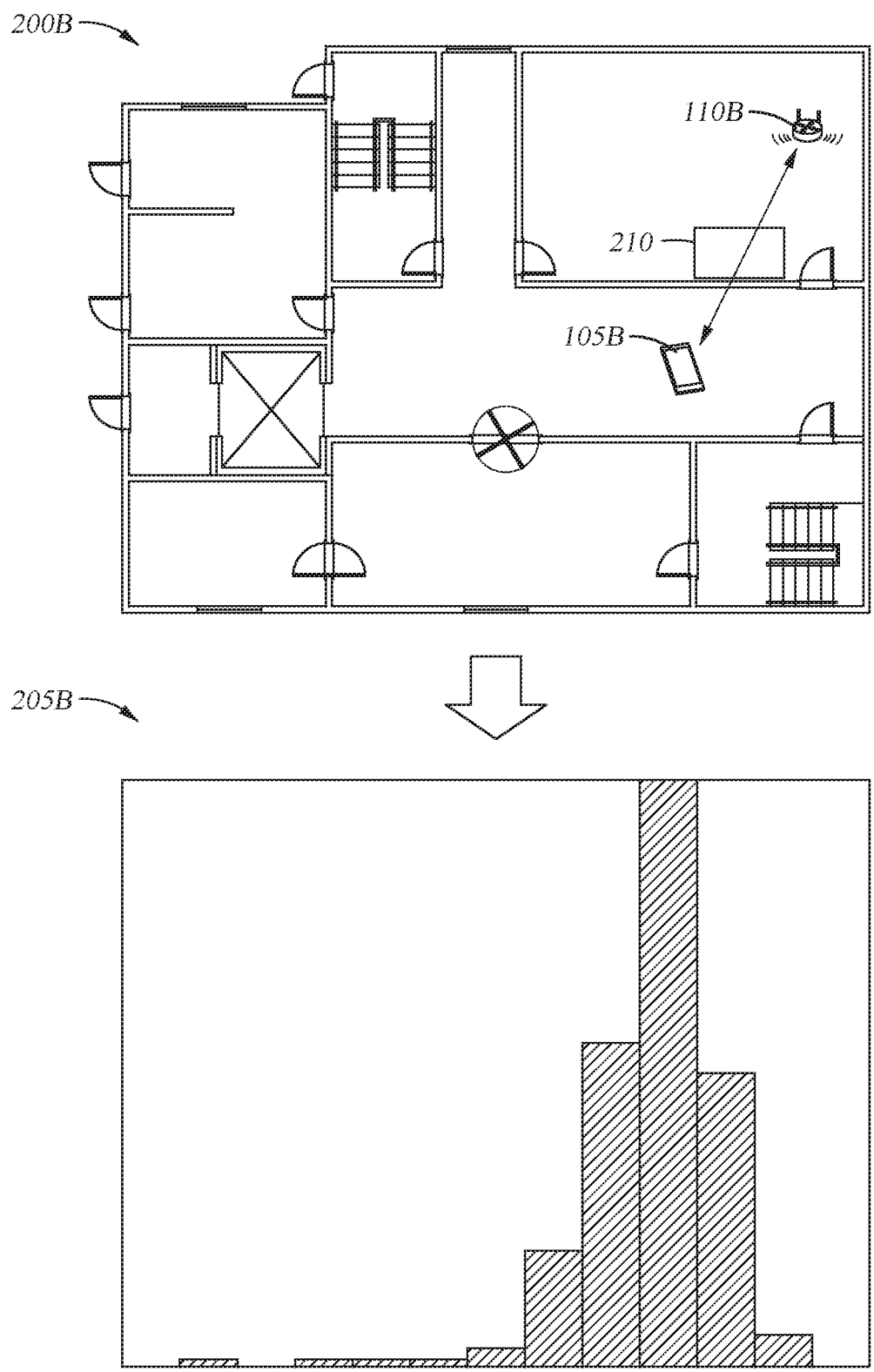
Figure 2C:
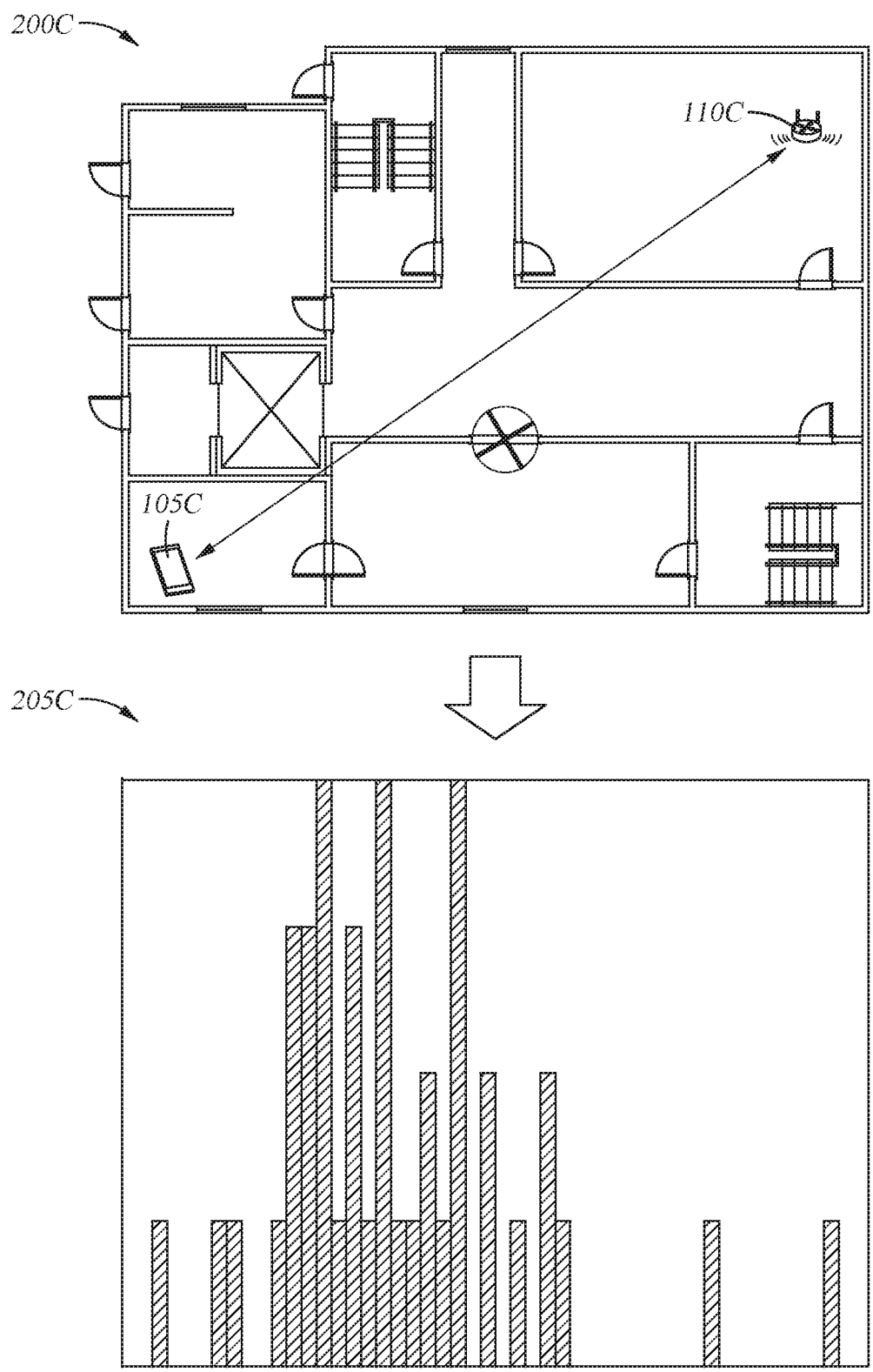

FIGS. 2A, 2B, and 2C depict deployment environments and RF characteristics used to selectively respond to client requests, according to several embodiments disclosed herein. Specifically, FIG. 2A depicts an Environment 200A where a requesting Client Device 105A is relatively close to an AP 110A, FIG. 2B depicts an Environment 200B where the line between a requesting Client Device 105B and an AP 110B is obscured by an Obstacle 210, and FIG. 2C depicts an Environment 200C where a requesting Client Device 105C is relatively far from an AP 110C. Additionally, FIGS. 2A, 2B, and 2C also depict respective histograms 205A-C illustrating signal characteristics in the depicted arrangement. In each histogram 205A-C, the estimated range (e.g., the time of flight for the signal) is depicted on the horizontal axis, divided into buckets corresponding to the number of packets or frames that reflected that range. The range estimate of each bucket is depicted along the vertical axis.

In the illustrated embodiments, the environments 200 are generally depicted as two-dimensional floor plans. Recall, however, that in many deployments, the APs 110 are mounted on or near the ceiling, rather than on the same plane as the floor and/or Client Devices 105. This is particularly true in commercial spaces such as enterprises, coliseums, conferences, trade shows, and the like. As illustrated in the histogram 205A, when the Client Device 105A is too close to the AP 110A, the vertical distance between the AP 110A and the Client Device 105A plays a significant role in the ranging. As illustrated, some of the signal arrives directly at the AP 110A (e.g., depicted by the left peak) while some signal bounces off the floor before reaching the AP 110A (e.g., depicted by the right peak). That is, the signals which bounce will tend to have over-estimated range.

Further, the resulting range estimate is also over-estimated, due to the vertical position of the AP 110A. For example, suppose the Client Device 105A is directly beneath the AP 110A, and the AP 110A is located on the ceiling of a warehouse. In embodiments, the ranging estimate will be relatively high (e.g., corresponding to the distance between the floor of the warehouse and the ceiling of the warehouse), even though the relevant distance between the AP 110A and Client Device 105A (e.g., the horizontal distance) is zero. That is, Client Devices 105 typically desire to know the horizontal distance to the AP 110 (e.g., along the x-y plane, without reference to the vertical z axis), but ordinary ranging simply returns the absolute distance (e.g., the hypotenuse of the triangle).

FIG. 2B depicts an Environment 200B where the line between a requesting Client Device 105B and an AP 110B is obscured by an Obstacle 210. The Obstacle 210 can generally correspond to any number of elements, including physical objects that interfere with or block RF signals. Although some Obstacles 210 are more RF-opaque than others (e.g., a fridge will likely block more signal than a book case), any obstacle (including relatively RF transparent objects such as particleboard walls) can cause concerns if sufficient blockage is present.

In the illustrated histogram 205B, the Obstacle 210 has resulted in the estimated range being significantly overestimated. In some embodiments, the system can identify this concern based on the stochasticity/regularity of the pattern. For example, as depicted in the histogram 205B, the distribution of signals is lopsided, with a longer tail towards the low end of the values. This deviation from the standard bell curve can cause the system to infer that RF conditions are causing inaccurate or untrustworthy results.

FIG. 2C depicts an Environment 200C where a requesting Client Device 105C is relatively far from an AP 110C. As depicted in the illustrated histogram 205C, this distance causes the readings to be unusable and not trustworthy (e.g., because they are so varied). This can be caused due to weak signal, additional multipath interference caused by the distance, and the like.

Figure 3:
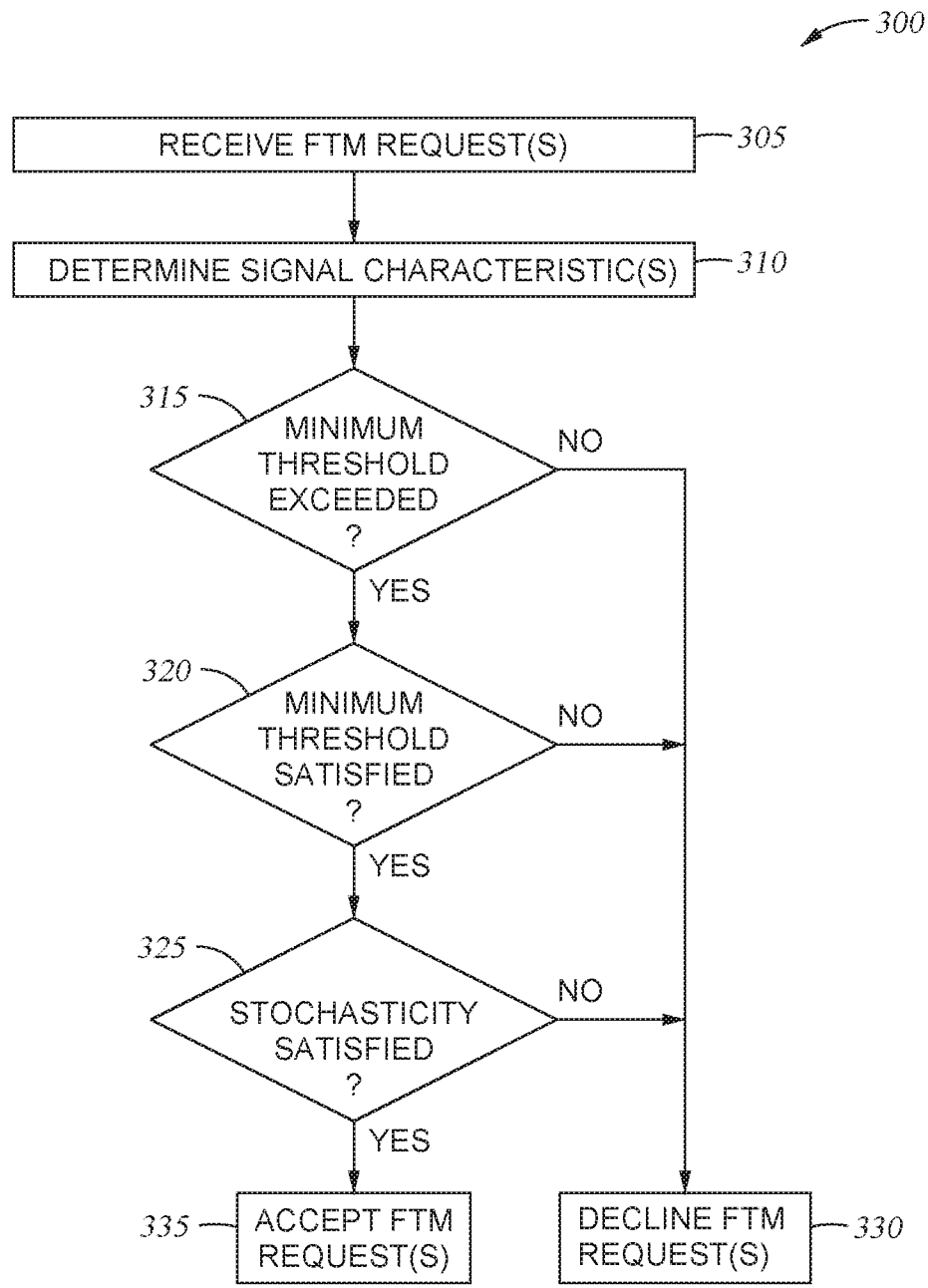
FIG. 3 is a flow diagram illustrating a method for selectively responding to client requests based on estimated distances, according to one embodiments disclosed herein.

FIG. 3 is a flow diagram illustrating a method 300 for selectively responding to client requests based on estimated distances, according to one embodiments disclosed herein. The method 300 begins at block 305, where an AP receives one or more FTM requests from a client device. The method 300 then continues to block 310, where the AP determines and evaluates one or more signal characteristics. As discussed above, in various embodiments, these can include the RSSI, CSI, signal variance, stochasticity, and the like. In some embodiments, this evaluation includes determining or estimating a distance to the client device. For example, based on the magnitude of the RSSI, the AP can estimate a distance to the client.

At block 315, the AP determines whether the signal characteristics exceed one or more predefined minimum thresholds. In one such embodiment, if the evaluation included estimating a distance to the client, the minimum threshold can be a minimum distance. In some embodiments, the AP utilizes a maximum RSSI value as a proxy for minimum distance. If the minimum threshold is not exceeded (e.g., the AP determines or predicts that the client is too close to the AP), the method 300 continues to block 330.

Returning to block 315, if the minimum criteria are satisfied, the method 300 continues to block 320. At block 320, the AP similarly determines whether one or more maximum, thresholds are satisfied. For example, if the distance is known or estimated, the AP determines whether this distance is above a predefined threshold, indicating that the client device is too far for accurate ranging. In another embodiment, the AP uses a minimum RSSI as a proxy for maximum distance. If the AP determines that the maximum criteria are not satisfied (e.g., because the client is too far away), the method 300 proceeds to block 330.

Returning to block 320, if the AP determines that the client is not too far, the method continues to block 325. At block 325, determines whether the stochasticity of the signal satisfies predefined criteria. This can include, for example, determining whether the variance exceeds a threshold, whether the signal distribution is skewed left or right from a normal curve, and the like. If the criteria are not satisfied, the method 300 continues to block 330. If the stochasticity requirements are met, however, the method 300 proceeds to block 335.

At block 335, the AP accepts the FTM request(s) for the client. This can include, for example, generating and transmitting one or more response to the request, in order to perform FTM ranging. In contrast, if the above criteria were not satisfied, the method 300 continues to block 330. At block 330, the AP declines the requests. In one embodiment, this includes ignoring the requests. In some embodiments, the AP can further inform the client that the request has been declined. In at least one embodiment, the AP advertises to the client that it does not support FTM, in order to prevent the client device from transmitting additional requests.

Although depicted as sequential criteria for conceptual clarity, in embodiments, the various signal evaluations can be performed in any order and/or simultaneously. Further, in some embodiments, each AP may evaluate a subset of the criteria while ignoring others. For example, one AP may be configured to evaluate distance while ignoring stochasticity, because no significant RF obstacles are located in the environment.

Figure 4:
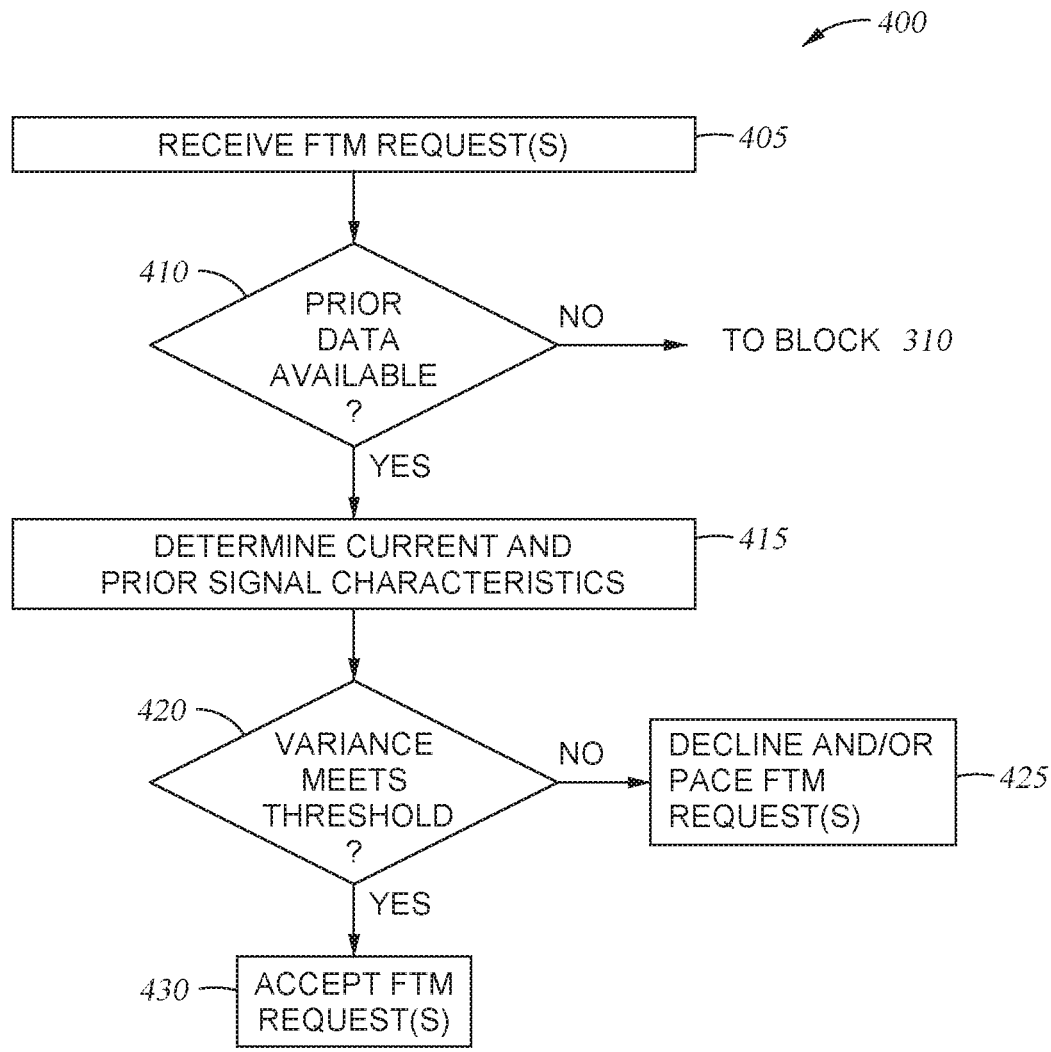
FIG. 4 is a flow diagram illustrating a method for selectively responding to client requests based on prior knowledge, according to one embodiments disclosed herein.

FIG. 4 is a flow diagram illustrating a method 400 for selectively responding to client requests based on prior knowledge, according to one embodiments disclosed herein. The method 400 begins at block 405, where an AP receives one or more FTM requests from a client device. At block 410, the AP determines whether prior data is available for the client. In one embodiment, this includes determining whether the client previously initiated and/or completed an FTM exchange. In another embodiment, this includes determining whether the location of the client is known. If no such data is available (e.g., the AP has no knowledge of the location or distance to the client), the method 400 continues to block 310 of FIG. 3, and analyzes the signals.

If the AP has prior knowledge of the client, the method 400 continues to block 415. At block 415, the AP determines and evaluates the current signal characteristics, as well as the prior signal characteristics. By evaluating the signal characteristics over time, the AP can determine whether the client device is moving and/or has moved. At block 420, the AP then evaluates the variance in signal characteristics over time, in order to determine whether it satisfies predefined criteria. For example, the AP can determine whether the device has moved at all (or has moved above a predefined threshold distance) for one or more periods of time.

If the variance is below the defined threshold (e.g., because the client device has not moved), the method 400 proceeds to block 425. At block 425, the AP declines and/or paces the FTM requests from the client device. In an embodiment, declining the request can include ignoring it/refraining from answering it, or explicitly declining. In one embodiment, pacing the FTM requests can include responding to some while ignoring others (or instructing the client to only transmit a limited number). For example, the AP may determine to respond to one FTM request per minute for the given client device, regardless of how many it transmits. Of course, if the client device begins moving, the AP may respond to FTM requests normally.

Returning to block 420, if the AP determines that the threshold has been exceeded (e.g., because the client device is moving), the AP accepts the FTM requests and responds normally. In some embodiments, the method 400 can be combined with the method 300 in order to further improve the operations of the system. For example, rather than immediately accepting the request, the AP may utilize method 300 to ensure the requests satisfy other criteria.

Figure 5:
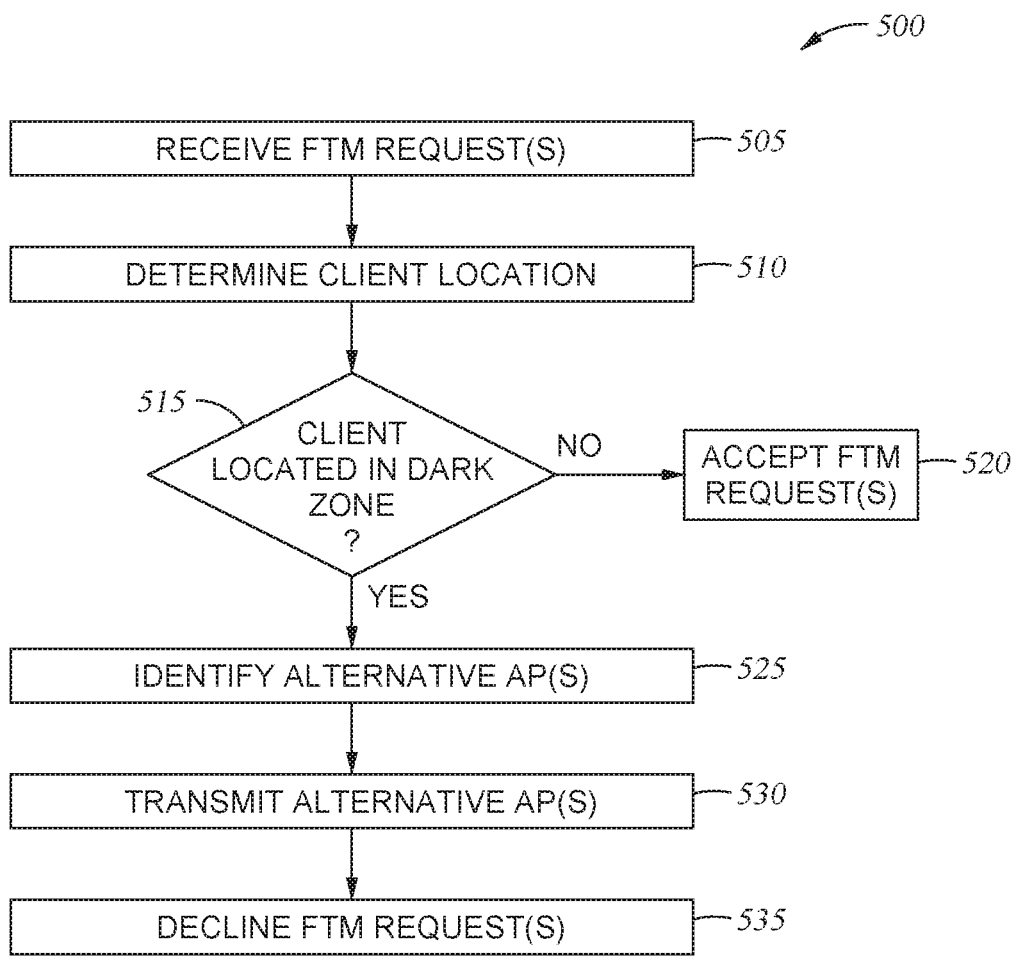
FIG. 5 is a flow diagram illustrating a method for selectively responding to client requests based on estimated client locations, according to one embodiments disclosed herein.

FIG. 5 is a flow diagram illustrating a method 500 for selectively responding to client requests based on estimated client locations, according to one embodiments disclosed herein. The method 500 begins at block 505, where an AP receives one or more FTM requests. At block 510, the AP determines the location of the client device. In one embodiment, the client device itself provides this information. For example, based on prior ranging to one or more APs, global positioning system (GPS) capability, or other technologies, the client device may know its current or recent location. In some embodiments, the client reports this position to the AP (e.g., via a LMR). Once the client location has been identified, the method 500 continues to block 515.

At block 515, the AP compares the client location to a predefined set of forbidden zones (also referred to as dark zones). As discussed above, in an embodiment, forbidden zones are areas of the physical space where ranging should not be performed due to inaccuracies (e.g., because of obstacles). In embodiments, each AP can be associated with a respective set of forbidden zones, based on their location. That is, because the obstructed areas will differ depending on the location of the AP, an area (e.g., a board room) may be a forbidden zone for one AP (e.g., because an elevator shaft is between the AP and the room), while it is not a forbidden zone for another (e.g., for an AP that is in the board room).

If the AP determines that the client is not within one of its defined dark zones, the method 500 continues to block 520, where the AP accepts the FTM requests and performs ranging with the device. In some embodiments, the method 500 can be combined with the methods 400 and/or 300, discussed above, to further improve the system. That is, rather than accepting the request, the AP may perform the method 400 and/or 300 to evaluate other criteria.

Returning to block 515, if the AP determines that the client is located within one of its dark zones, the method 500 proceeds to block 525. At block 525, the AP identifies zero or more alternative AP(s), based on the client location and/or dark zone(s). For example, the AP may identify AP(s) that are relatively closer to the client, and/or AP(s) that are positioned such that the client location is not within a dark zone for the other AP. At block 530, the AP transmits an indication of these alternative AP(s) to the client device. In this way, the client device can be informed as to which AP(s) it should next request ranging with, in order to reduce the likelihood that it will be rejected again (and to improve the likelihood that the results will be accurate and useful). The method 500 then continues to block 535, where the AP declines the requests. As discussed above, this can include refraining from responding, explicitly declining, advertising that ranging is not supported, and the like.

Figure 6:
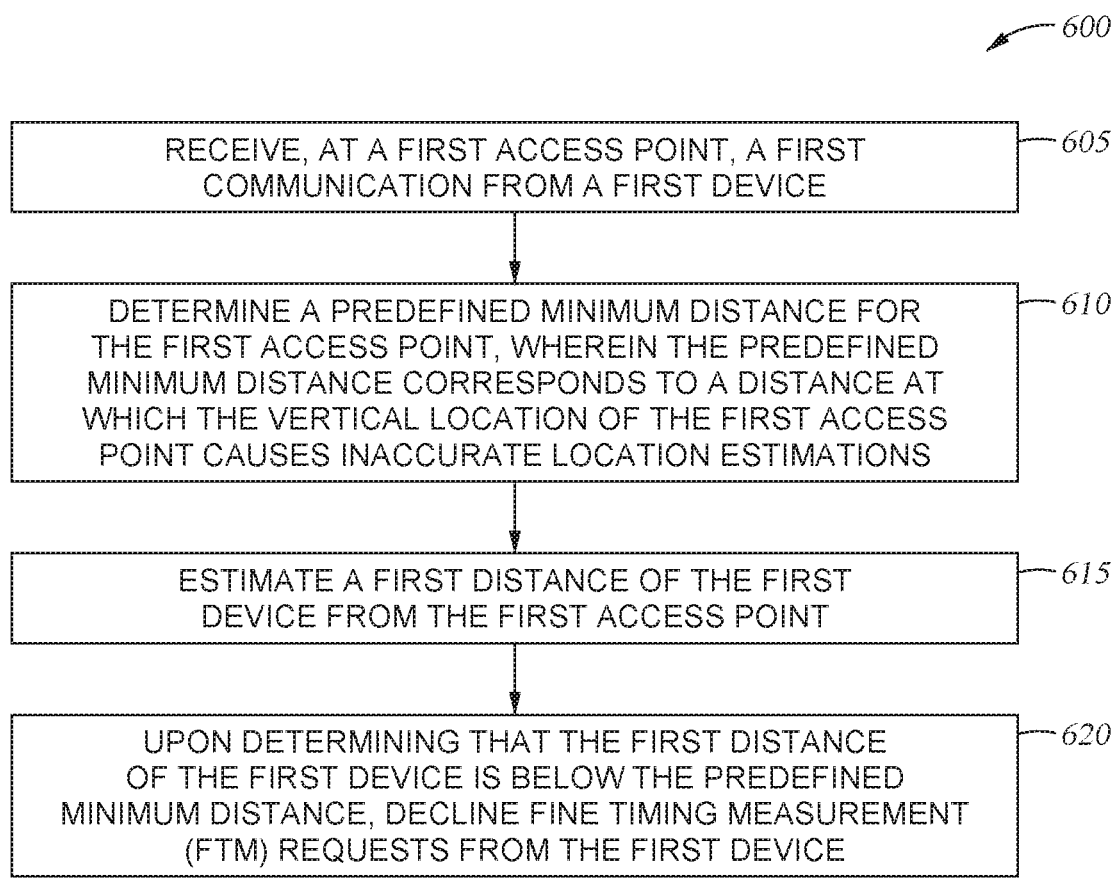
FIG. 6 is a flow diagram illustrating a method for selectively responding to client requests, according to one embodiments disclosed herein.

FIG. 6 is a flow diagram illustrating a method 600 for selectively responding to client requests, according to one embodiments disclosed herein. The method 600 begins at block 605, where an AP receives, at a first access point, a first communication from a first device. At block 610, the AP determines a predefined minimum distance for the first access point, wherein the predefined minimum distance corresponds to a distance at which the vertical location of the first access point causes inaccurate location estimations. The method 600 continues to block 615, where the AP estimates a first distance of the first device from the first access point. Additionally, at block 620, upon determining that the first distance of the first device is below the predefined minimum distance, the AP declines fine timing measurement (FTM) requests from the first device.

Figure 7:
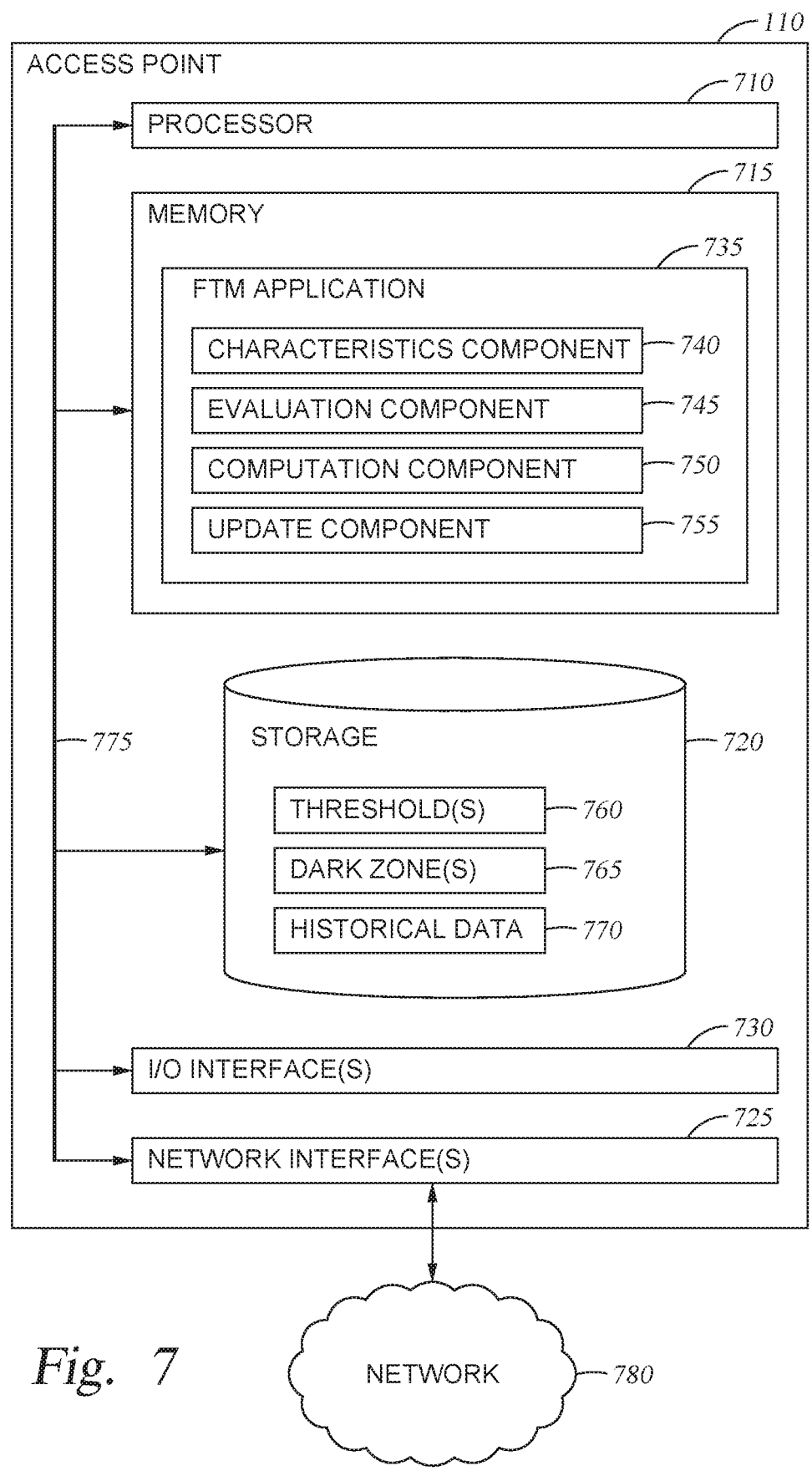
FIG. 7 is a block diagram depicting an access point configured to selectively respond to client requests, according to one embodiments disclosed herein.

FIG. 7 is a block diagram depicting an AP 110 configured to selectively respond to client requests, according to one embodiments disclosed herein. Although depicted as a single physical device, in some embodiments, some or all of the functionality described herein can be performed by one or more devices jointly, by one or more virtual machines, and the like. Additionally, although depicted as an AP 110, in some embodiments, some or all of the functionality described herein can be performed by other devices, such as a network controller.

As illustrated, the AP 110 includes a Processor 710, Memory 715, Storage 720, a Network Interface 725, and one or more I/O Interfaces 730. In the illustrated embodiment, the Processor 710 retrieves and executes programming instructions stored in Memory 715, as well as stores and retrieves application data residing in Storage 720. The Processor 710 is generally representative of a single CPU and/or GPU, multiple CPUs and/or GPUs, a single CPU and/or GPU having multiple processing cores, and the like. The Memory 715 is generally included to be representative of a random access memory. Storage 720 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, input and output devices (such as keyboards, monitors, etc.) are connected via the I/O Interface(s) 730. Further, via the Network Interface 725, the AP 110 can be communicatively coupled with one or more other devices and components (e.g., via the Network 780, which may include the Internet, local network(s), and the like). Additionally, the Network 780 may include wired connections, wireless connections, or a combination of wired and wireless connections. Further, as illustrated, the Processor 710, Memory 715, Storage 720, Network Interface(s) 725, and I/O Interface(s) 730 are communicatively coupled by one or more Buses 775.

In the illustrated embodiment, the Storage 720 includes a set of Thresholds 760, Dark Zones 765, and Historical Data 770. Although depicted as residing in Storage 720, in embodiments, the Thresholds 760, Dark Zones 765, and Historical Data 770 may be located in any suitable location. For example, in some embodiments some or all of the Thresholds 760, Dark Zones 765, and Historical Data 770 may be stored in a centralized repository for the deployment (e.g., by a wireless controller). The Thresholds 760 generally correspond to criteria used to evaluate signal characteristics of requesting devices, such as minimum and/or maximum distances, minimum and/or maximum RSSI, and the like. In some embodiments, the Thresholds 760 are specific to the AP 110, such that other APs 110 can have different Thresholds 760.

Similarly, as discussed above, the Dark Zones 765 are regions of the physical space where the AP 110 will decline ranging requests. In some embodiments, each AP 110 has a respective set of Dark Zones 765. That is, different APs 110 may have sets of Dark Zones 765 that entirely overlap, partially overlap, or are entirely distinct. The Historical Data 770 generally corresponds to signal data from one or more client devices (such as location data). This data is used to determine whether the client device is moving enough to warrant ranging, or if the ranging should be paced or declined.

As illustrated, the Memory 715 includes an FTM Application 735. Although depicted as software residing in Memory 715, in embodiments, the functionality of the FTM Application 735 may be implemented using hardware, software, or a combination of hardware and software. The FTM Application 735 includes a Characteristics Component 740, an Evaluation Component 745, a Computation Component 750, and an Update Component 755. Although depicted as discrete components for conceptual clarity, in embodiments, the operations of the Characteristics Component 740, Evaluation Component 745, Computation Component 750, and Update Component 755 may be combined or distributed across any number of components and devices.

In embodiments, the Characteristics Component 740 generally evaluates received FTM requests and/or other transmissions from client devices, in order to characterize the signal and/or client. This can include, for example, determining the RSSI, CSI, location, and the like. The Evaluation Component 745 generally evaluates these characterizations and compares them to the Thresholds 760 and/or Dark Zones 765 in order to determine whether the request(s) should be acknowledged. In an embodiment, if the Evaluation Component 745 determines that the requests should be allowed, the Computation Component 750 performs the ranging with the client.

In one embodiment, the Update Component 755 is used to periodically or continuously update the Thresholds 760, Dark Zones 765, and/or Historical Data 770. For example, by on observing ranging interactions, the Update Component 755 may determine that one or more of the Thresholds 760 and/or Dark Zones 765 should be changed (e.g., because a recent ranging interaction yielded unsatisfactory data). In this way, the FTM Application 735 can learn about the deployment and RF environment, and improve functionality over time.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product.

Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   receiving, at a first access point, a first communication from a first device;
   determining a predefined minimum distance for the first access point, wherein the predefined minimum distance corresponds to a distance at which a vertical location of the first access point causes fine timing measurement (FTM) techniques to result in inaccurate location estimations;
   estimating a first distance of the first device from the first access point;
   upon determining that the first distance of the first device is below the predefined minimum distance, declining FTM requests from the first device.

2. The method of claim 1, the method further comprising:
   receiving, at the first access point, a second communication from a second device;
   estimating a second distance of the second device from the first access point; and
   upon determining that the second distance of the second device is above the predefined minimum distance, accepting fine timing measurement (FTM) requests from the second device.

3. The method of claim 1, wherein estimating the first distance of the first device comprises evaluating a received signal strength indicator (RSSI) for the first device.

4. The method of claim 1, the method further comprising:
   receiving, at the first access point, a second communication from a second device;
   determining stochasticity of the second communication; and
   upon determining that the stochasticity of the second communication exceeds a predefined threshold, declining FTM requests from the second device.

5. The method of claim 4, wherein the stochasticity of the second communication comprises a variance from a mean value.

6. The method of claim 1, the method further comprising:
   receiving, at the first access point, a second communication from a second device;
   estimating a second distance of the second device from the first access point, at a first point in time;
   estimating a third distance of the second device from the first access point, at a second point in time; and
   upon determining that a difference between the second distance and the third distance is below a predefined threshold, declining FTM requests from the second device.

7. The method of claim 1, the method further comprising:
   receiving, at the first access point, a second communication from a second device;
   determining a predefined maximum distance for the first access point, wherein the predefined maximum distance corresponds to a distance at which ranging to the first access point causes inaccurate location estimations;
   estimating a second distance of the second device from the first access point; and
   upon determining that the second distance of the second device is above the predefined maximum distance, declining fine timing measurement (FTM) requests from the second device.

8. The method of claim 1, the method further comprising:
   receiving, at the first access point, a second communication from a second device;
   estimating a location of the second device;
   determining a location of the access point; and
   using Pythagorean computation to account for the vertical location of the access point, based on the location of the second device and the location of the access point, when responding to FTM requests from the second device.

9. The method of claim 1, the method further comprising:
   receiving, at the first access point, a second communication from a second device;
   estimating a location of the second device; and
   upon determining that the location of the second device is within a predefined forbidden zone, declining FTM requests from the second device.

10. The method of claim 1, the method further comprising:
    receiving, at the first access point, a second communication from a second device;
    estimating a location of the second device; and
    identifying a second access point that is better-positioned to respond to the second device, as compared to the first access point, based on the location of the second device; and
    transmitting, to the second device, an indication of the second access point.

11. A non-transitory computer-readable storage medium containing computer program code that, when executed by operation of one or more computer processors, performs an operation comprising:
    receiving, at a first access point, a first communication from a first device;
    determining a predefined minimum distance for the first access point, wherein the predefined minimum distance corresponds to a distance at which a vertical location of the first access point causes fine timing measurement (FTM) techniques to result in inaccurate location estimations;
    estimating a first distance of the first device from the first access point;
    upon determining that the first distance of the first device is below the predefined minimum distance, declining FTM requests from the first device.

12. The computer-readable storage medium of claim 11, the operation further comprising:
    receiving, at the first access point, a second communication from a second device;
    determining stochasticity of the second communication; and
    upon determining that the stochasticity of the second communication exceeds a predefined threshold, declining FTM requests from the second device.

13. The computer-readable storage medium of claim 11, the operation further comprising:
    receiving, at the first access point, a second communication from a second device;
    estimating a second distance of the second device from the first access point, at a first point in time;
    estimating a third distance of the second device from the first access point, at a second point in time; and upon determining that a difference between the second distance and the third distance is below a predefined threshold, declining FTM requests from the second device.

14. The computer-readable storage medium of claim 11, the operation further comprising:
receiving, at the first access point, a second communication from a second device;
estimating a location of the second device;
determining a location of the access point; and
using Pythagorean computation to account for the vertical location of the access point, based on the location of the second device and the location of the access point, when responding to FTM requests from the second device.

15. The computer-readable storage medium of claim 11, the operation further comprising:
receiving, at the first access point, a second communication from a second device;
estimating a location of the second device; and
identifying a second access point that is better-positioned to respond to the second device, as compared to the first access point, based on the location of the second device; and
transmitting, to the second device, an indication of the second access point.

16. A system comprising:
one or more computer processors; and
a memory containing a program which when executed by the one or more computer processors performs an operation, the operation comprising:
receiving, at a first access point, a first communication from a first device;
determining a predefined minimum distance for the first access point, wherein the predefined minimum distance corresponds to a distance at which a vertical location of the first access point causes fine timing measurement (FTM) techniques to result in inaccurate location estimations;
estimating a first distance of the first device from the first access point;
upon determining that the first distance of the first device is below the predefined minimum distance, declining FTM requests from the first device.

17. The system of claim 16, the operation further comprising:
receiving, at the first access point, a second communication from a second device;
determining stochasticity of the second communication; and
upon determining that the stochasticity of the second communication exceeds a predefined threshold, declining FTM requests from the second device.

18. The system of claim 16, the operation further comprising:
receiving, at the first access point, a second communication from a second device;
estimating a second distance of the second device from the first access point, at a first point in time;
estimating a third distance of the second device from the first access point, at a second point in time; and
upon determining that a difference between the second distance and the third distance is below a predefined threshold, declining FTM requests from the second device.

19. The system of claim 16, the operation further comprising:
receiving, at the first access point, a second communication from a second device;
estimating a location of the second device;
determining a location of the access point; and
using Pythagorean computation to account for the vertical location of the access point, based on the location of the second device and the location of the access point, when responding to FTM requests from the second device.

20. The system of claim 16, the operation further comprising:
receiving, at the first access point, a second communication from a second device;
estimating a location of the second device; and
identifying a second access point that is better-positioned to respond to the second device, as compared to the first access point, based on the location of the second device; and
transmitting, to the second device, an indication of the second access point.

\* \* \* \* \*